US006536791B1

(12) United States Patent

Adams

(10) Patent No.: US 6,536,791 B1

(45) Date of Patent: Mar. 25, 2003

(54) ADJUSTABLE MATRIX WHEELCHAIR SEAT

(76) Inventor: Christina L. Adams, 3950 W. Durham Dr., Bartlesville, OK (US) 74006

( * ) Notice: Subject to any disclaimer, the term of this patent is extended or adjusted under 35 U.S.C. 154(b) by 0 days.

(21) Appl. No.: 09/794,856

(22) Filed: Feb. 27, 2001

(51) Int. Cl.[7] .................................... B62M 1/14

(52) U.S. Cl. .................................. 280/250.1; 280/304.1; 297/452.64

(58) Field of Search .......................... 280/250.1, 304.1, 280/644, 650; 297/284.2, 452.63, 452.64, 204

(56) References Cited

U.S. PATENT DOCUMENTS

| | | | | | |
|---|---|---|---|---|---|
| 2,934,134 | A | * | 4/1960 | Adler | |
| 3,590,901 | A | * | 7/1971 | Dubinsky | 297/452 |
| 3,887,228 | A | * | 6/1975 | Ingerson | 297/DIG. 4 |
| 4,057,291 | A | * | 11/1977 | Dubinsky | 297/441 |
| 4,685,738 | A | * | 8/1987 | Tinus | 297/452 |
| 4,778,192 | A | * | 10/1988 | McElfresh | 280/261 |
| 5,335,975 | A | * | 8/1994 | Krouskop et al. | 297/452.63 |
| 5,800,371 | A | * | 9/1998 | Winn | 602/26 |
| 5,882,320 | A | * | 3/1999 | Peterson | 602/3 |
| 6,092,249 | A | | 7/2000 | Kamen et al. | |
| 6,206,405 | B1 | * | 3/2001 | Watkins | 280/647 |
| 6,338,527 | B1 | * | 1/2002 | Toyota et al. | 297/229 |

* cited by examiner

*Primary Examiner*—Anne Marie Boehler

(74) *Attorney, Agent, or Firm*—Frank J. Catalano

(57) ABSTRACT

An adjustable matrix wheelchair seat can be mounted on a pair of rods such as are provided on the seat rails of a typical wheelchair or on any pair of rods adapted to be rigidly fixed to and aligned in a longitudinal direction relative to the frame of the wheelchair. A lateral array of spaced apart substantially inelastic straps is extended between and engaged on the rods. A longitudinal array of spaced apart substantially inelastic straps is engaged on the forwardmost and rearwardmost straps of the lateral array. The longitudinal array traverses the lateral array to define a horizontal matrix of ventilating interstices. The length of any or all of the straps of the lateral and horizontal arrays is independently adjustable to permit alteration of the pressure pattern imposed on the arrays by the patient occupying the seat.

11 Claims, 6 Drawing Sheets

ADJUSTABLE MATRIX WHEELCHAIR SEAT

BACKGROUND OF THE INVENTION

This invention relates generally to wheelchairs and more particularly concerns wheelchair seats.

Pressure sores are a major problem for many wheelchair patients. According to David Springer in *Home Health Care Dealer Provider Magazine,* "Pressure ulcers and related co-morbidities constitute the greatest impairment in quality of life, increase in expenses for care, and extended hospital stay for those requiring wheelchairs as their primary mode of locomotion." Pressure sores can develop quickly. *The Merck Manual of Diagnosis and Therapy* states, "In an immobilized patient, severe pressure can impair local circulation in less than three hours, causing local tissue anoxia that, if unrelieved, progresses to necrosis of the skin and subcutaneous tissues. Moisture (e.g., from perspiration or incontinence) leads to tissue maceration and predisposes to pressure sores." Moisture and pressure are the two most significant factors in the occurrence of pressure sores. *In Drugs Aging,* J. B. Young says, "It has been estimated that the United States spends five billion dollars annually on the treatment of pressure sores."

One major strategy for preventing pressure sores in wheelchair occupants is to distribute pressure as evenly as possible over the entire interface area between the seated individual and the wheelchair. In order to determine the most effective distribution of pressure, an industry accepted mapping system uses a 36 by 36 cell matrix of 1,296 pressure sensing transducer to determine the pressure pattern imposed on a seat by a wheelchair occupant. The test gives a computer screen visual of the cells to which pressure is applied and the magnitude of the pressure applied to each cell. Common areas where pressure sores develop include the soft tissue overlying the ischial tuberosities and coccyx, the former being the most common. These bony prominences cause acute areas of pressure in almost every seated individual, but this problem is exacerbated for wheelchair patients, and especially elderly wheelchair occupants. Because wheelchair patients are seated for extended periods of time, and do not tend to move around or shift in their seats often, the risk of pressure sores caused by unrelieved constant pressure and the buildup of moisture from perspiration is great. Circulation difficulties and poor seating posture further increase the risk of pressure sores. Furthermore, a wheelchair seat with perforations allows moisture and the heat which precedes moisture vapor to be exchanged with surrounding air. However, simple perforated seats do not provide suitable pressure distribution and do not fold, so the wheelchair is not as easily portable as a standard wheelchair.

One common method of reducing acute pressure areas for wheelchair patients is the use of seat cushions, which compress under bony prominences and/or offer more firm support in regions at less risk for developing pressure sores, such as the posterior thighs. While cushions of this type do lessen the load on sensitive areas of the skin, they do not always relieve enough pressure to encourage adequate circulation, nor do they always encourage good seating posture in wheelchair patients. Further, most cushions facilitate rather than minimize the occurrence and retention of moisture from perspiration at the seat interface because they use fabrics which do not breathe and because they increase the surface area in contact with the wheelchair patient. Seat cushions also have other incidental negatives such as adding weight to the chair and making transport of the chair more inconvenient. Added weight makes mobility more difficult for persons with impaired upper body strength. For active wheelchair users who are in and out of vehicles often, it is not always convenient to transport and handle a seat cushion in addition to the wheelchair itself.

Furthermore, seat cushions are not always available or practical. In many nursing homes and long term care facilities, wheelchairs are provided, but cushions are not provided. Most wheelchairs fold for ease of transport, but the cushion must be removed when the wheelchair is folded. Some cushions are contoured to predispose the pressure load to specific regions, usually the posterior thighs. When cushions are removed and then returned to wheelchair seats, they are sometimes inadvertently rotated so the orientation is improper and the pressure problem is actually aggravated for the wheelchair patient.

Another method of reducing acute pressure areas for wheelchair patients is the use of active pneumatic or hydraulic systems to control cushion pressure. Such systems, as exemplified by U.S. Pat. No. 6,092,249 to Kamen et al, require fluid reservoirs, pressure sources and regulators and pneumatically or hydraulically discrete chambers, all of which contribute to higher cost, greater weight, less convenience and burdensome maintenance while offering no relief for ventilation problems.

It is, therefore, an object of this invention to provide a wheelchair seat which helps prevent pressure sores from occurring. Another object of this invention is to provide a wheelchair seat which allows pressure to be more evenly distributed over its surface. A further object of this invention is to provide a wheelchair seat which reduces acute pressure areas for wheelchair patients. Yet another object of this invention is to provide a wheelchair seat which facilitates the exchange of moisture and moisture vapor with the surrounding air. It is also an object of this invention to provide a wheelchair seat which encourages adequate circulation in wheelchair patients. Still another object of this invention is to provide a wheelchair seat which provides good seating posture in wheelchair patients. An additional object of this invention is to provide a wheelchair seat which does not significantly increase the weight of a wheelchair. Another object of this invention is to provide a wheelchair seat which does not exacerbate the inconvenience associated with transporting a wheelchair. A further object of this invention is to provide a wheelchair seat which is easily adjusted in the event of a change of occupants. Yet another object of this invention is to provide a wheelchair seat which requires no pneumatic or hydraulic systems. It is also an object of this invention to provide a wheelchair seat which requires little maintenance.

SUMMARY OF THE INVENTION

In accordance with the invention, a wheelchair seat is provided which can be mounted on the seat rails or a pair of rods which may be provided on the seat rails of a typical wheelchair or on any pair of rods adapted to be rigidly fixed to and aligned in a longitudinal direction relative to the frame of the wheelchair. A lateral array of spaced apart substantially inelastic straps is extended between and engaged on the rods. A longitudinal array of spaced apart substantially inelastic straps is engaged on the forwardmost and rearwardmost straps of the lateral array. The longitudinal array traverses the lateral array to define a horizontal matrix of ventilating interstices. The length of any or all of the straps of the lateral array is independently adjustable to permit alteration of the pressure pattern imposed on the arrays by the patient occupying the seat.

The lateral strap adjustment is preferably accomplished by use of adjustable buckles, one on the end of each adjustable strap of the lateral array. The lateral straps are extended over, along side of and below the rods and buckle at a point under and between the rods. Inadvertent slipping of the buckles is preferably prevented by use of mating segments of hook-and-loop material fixed to the buckled straps to secure the end of the strap which is inserted through the buckle against a portion of the strap not inserted through the buckle.

The forward end of each longitudinal strap is permanently fixed to the forwardmost strap of the lateral array. The length of any or all of the straps of the longitudinal array may also be independently adjustable. Preferably this is accomplished by use of segments of hook-and-loop material. For each longitudinal strap which is to be adjustable, one segment is fixed to the rearward end of the longitudinal strap and the mating segment is fixed to the rearwardmost strap of the lateral array. Most preferably, each of the straps of the longitudinal array is centered along the forwardmost strap of the lateral array at a first set of distance intervals and each of the corresponding mating segments of hook-and-loop material is centered along the rearwardmost strap of the lateral array at a second set of distance intervals greater than the first set. This affords a seat surface which is wider at the rear than at the front and balances the diverging relationships of the longitudinal straps to maximize pressure pattern control.

Migration of any one or all of the straps of the lateral array in relation to an adjacent strap of the lateral array can be checked by interlacing any or all of the straps of the longitudinal array with the lateral straps to be checked and an adjacent lateral strap or by fixing one or more bands of material at their ends to straps of the longitudinal array to define retaining loops surrounding the lateral straps to be checked. Preferably, in the former embodiment, all of the lateral and longitudinal straps are interlaced to form a weave. In the prototype seat, a one-to-one warp-weft weave was used, but various warp-weft patterns can be used depending on the width and migrating characteristics of the straps. In the latter embodiment, the bands are fixed against the bottom surface of the straps of the longitudinal array so that the top surface of the arrays will be as smooth as possible.

Migration of the matrix in relation to the rods may be satisfactorily checked by the taut adjustment of the forwardmost and rearmost straps of the lateral array to the rods. It may be desirable, however, to further assure that migration of the forwardmost and rearwardmost straps on the rods is checked. This can be accomplished by use of four studs, one fixed proximate each end of the rods and abutting an edge of the forwardmost and rearwardmost straps of the lateral array.

It may also be desirable that the portions of each strap of the lateral and longitudinal arrays which define the matrix be individually encased in contour fitted tubes of substantially inelastic washable material. In one prototype, such tubes were stitched to the straps with strips of foam disposed between the top of each strap and its contour fitted tube.

A similar matrix can be used for the back of the wheelchair using the wheelchair back posts or any pair of rods adapted to be extended from and aligned in an upright direction relative to the wheelchair frame. A lateral array of spaced apart substantially inelastic straps is extended between and engaged on the upright rods and a vertical array of spaced apart substantially inelastic straps is engaged on the uppermost and lowermost of the straps of the upright lateral array. The vertical array traverses the upright lateral array to define a vertical matrix of ventilating interstices. Preferably, the length of any or all of the upright lateral straps can be independently adjusted to alter the pressure pattern imposed on the upright lateral and vertical arrays by the back of the occupant of the wheelchair. Migration of the uppermost strap in relation to the upright rods is checked by the tautness of the uppermost strap. However, two brackets, one fixed proximate each upper end of the upright rods and supporting the uppermost strap, may be used to assure minimal possibility of migration.

The prototype adjustable matrix wheelchair seat has been demonstrated to adequately simultaneously control pressure, allow ventilation and reduce moisture. In the event a patient should develop skin redness or irritation, the seat is readily adjustable to maintain effectiveness, even as the physical status of the wheelchair user changes. The seat is lightweight, attached to a standard wheelchair frame by means of the existing upholstery supports, and folds in the same fashion as standard upholstery to allow ease of transport. It is adjustable to create a flat, taut surface in its forward region and a well or hip-bucket of desired contour in its rear portion. It encourages good posture. The seat is made of inexpensive materials and construction is simple.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
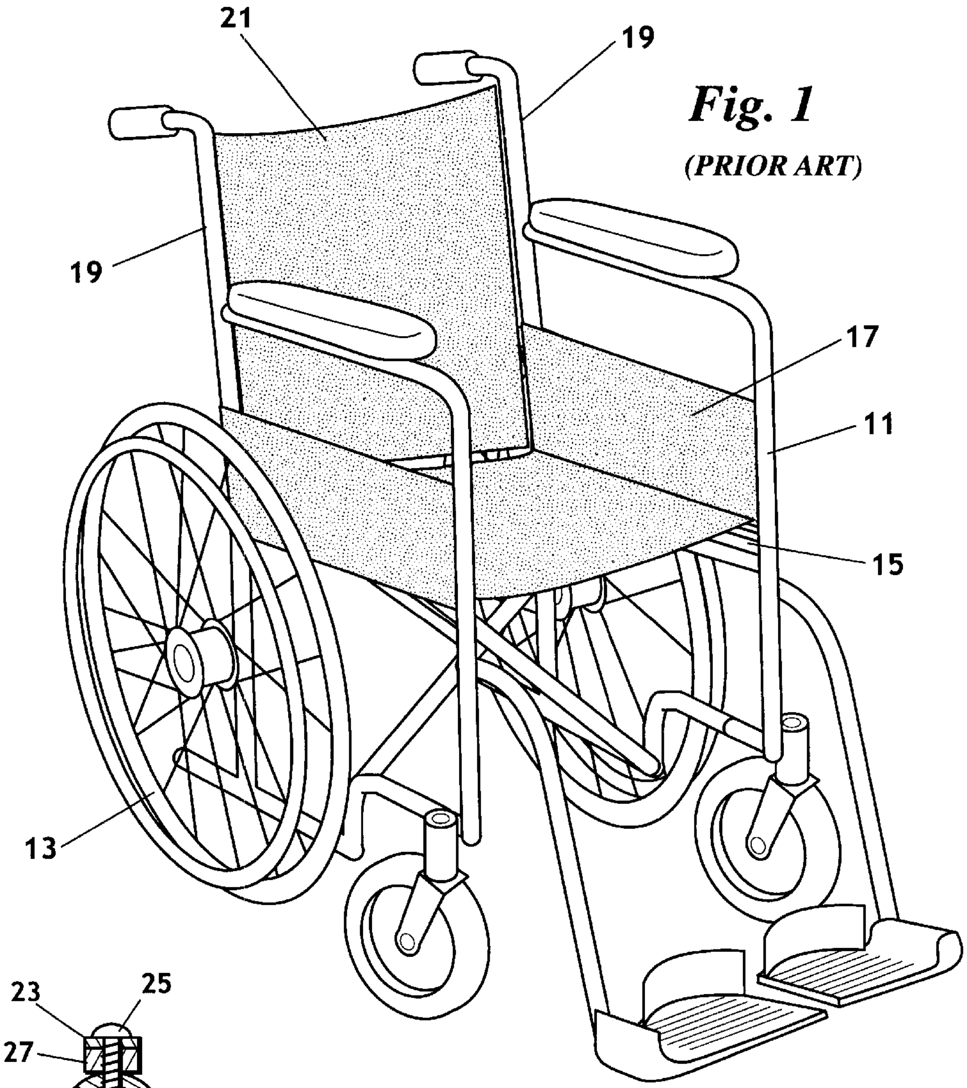
Fig. 1 (PRIOR ART)
FIG. 1 is a perspective view of a typical known wheelchair.

Turning first to FIG. 1, a typical wheelchair has a frame 11 supported on a carriage 13. Seat rails 15 support a seat 17 and vertical posts 19 support a back rest 21. The seat 17 and back rest 21 shown are typically formed from sheets of plastic providing a continuous surface from corner to corner on these components. Looking at FIGS. 2 and 3, the seat mounting components of the wheelchair are illustrated in greater detail. As shown, the seat rails 15 are parallel, spaced apart, horizontal tubes extending longitudinally in relation to the chair. Each rail 15 has a parallel rod 23, as shown a flat elongated piece of metal stock, fastened to the top of its respective rail 15 by a plurality of tap screws 25. The rods 23 are spaced above the rails 15 by spacers 27, typically metal sleeves. Thus, the rods 23 are fixed to and aligned in a longitudinal direction relative to the frame 11 of the chair.

Figure 4:
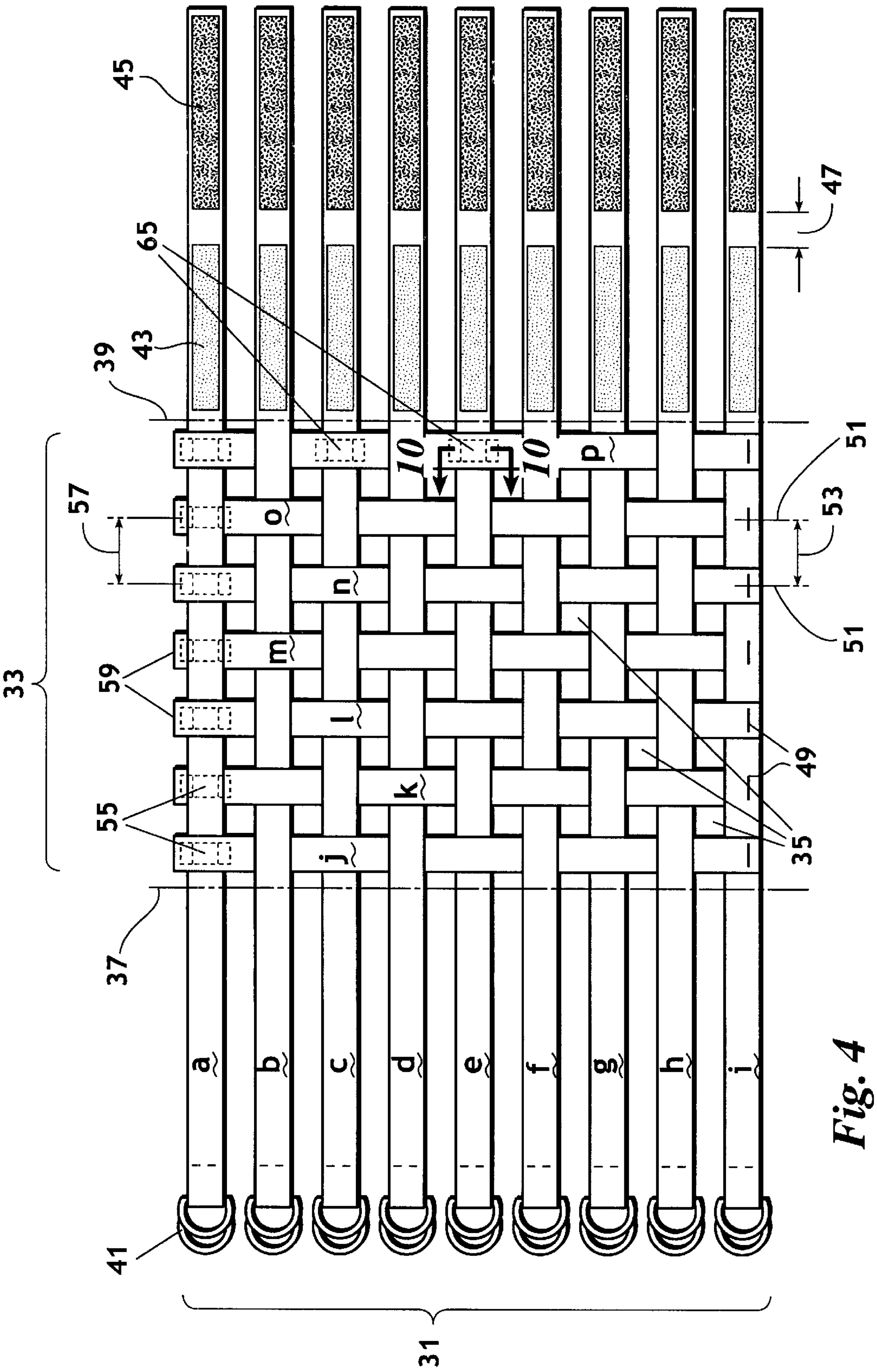
FIG. 4 is a top plan view of a preferred embodiment of the adjustable matrix wheelchair seat in a laid-out condition.
Figure 5:
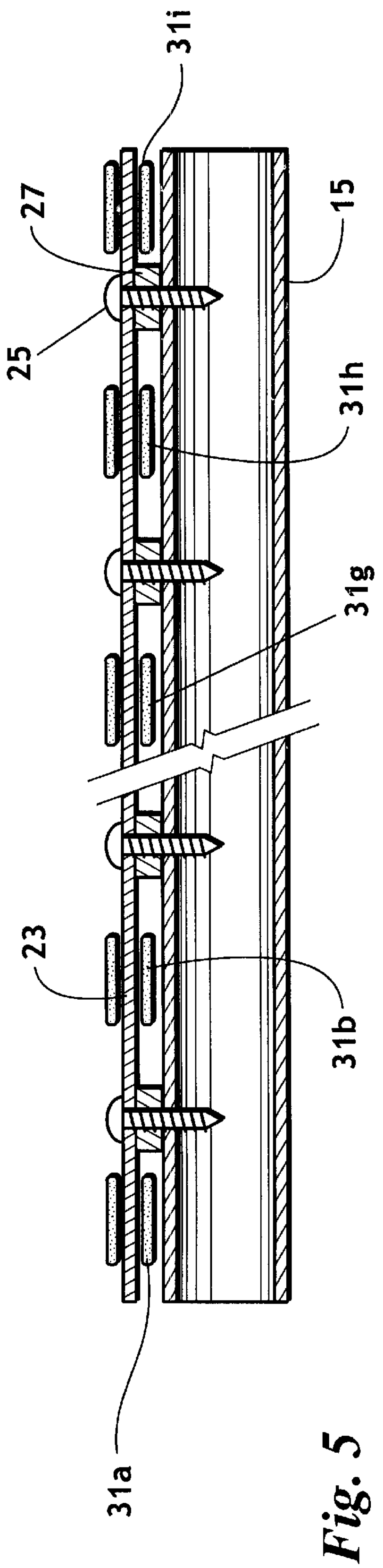
FIG. 5 is a vertical, longitudinal, diametric cross-sectional view of the seat of FIG. 4 mounted on the seat rails of FIG. 2.
Figure 6:
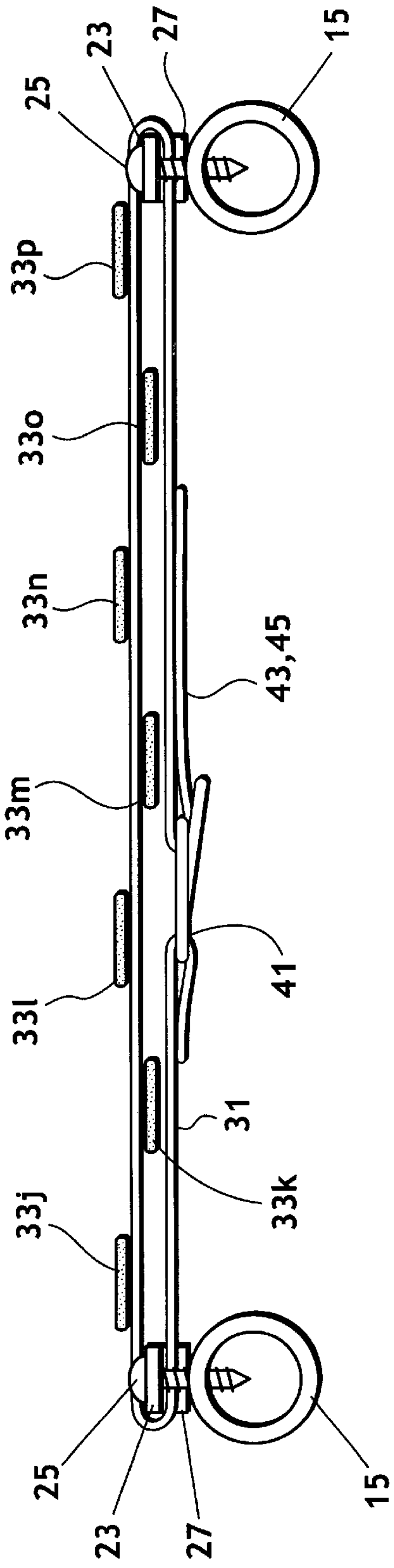
FIG. 6 is a front elevation view of the seat of FIG. 4 mounted on the seat rails of FIG. 2.

Turning to FIG. 4, an adjustable matrix wheelchair seat to replace the standard wheelchair upholstery 17 shown in FIG. 1 is illustrated. The adjustable seat will be attached to the wheelchair frame 11 by use of the existing metal rods 23 affixed to the seating support rail 15 to the wheelchair frame 11 or by an added pair of rods adapted to be fixed to the wheelchair frame. As shown, the adjustable matrix wheelchair seat is comprised of two arrays 31 and 33. of straps 31*a* through 31*i* and 33*j* through 33*p*, respectively. As shown, the straps of the arrays 31 and 33 are spaced apart and traverse each other so that the lateral array 31 and the longitudinal array 33 define a matrix of interstices 35 between the straps. As is best seen in FIGS. 5 and 6, the length of the lateral straps 31 is selected so that, when the straps 31 are laid across the rods 23 with the rods 23 aligned on longitudinal axes 37 and 39 just outside of the outermost longitudinal straps 33*j* and 33*p*, the straps 31 can wrap around the side of and under the rods 23 so their ends can be buckled below and between the rods 23. As shown, one end of each lateral strap 31 is provided with a buckle 41 such as the pair of D-rings shown. The other end of each lateral strap 31 is provided with mating segments 43 and 45 of hook-and-loop material, the mating segments 43 and 45 preferably being separated in the region 47 at which the buckles 41 will engage their respective straps 31. As shown, the longitudinal straps 33 are fixed to the forwardmost lateral strap 31*i*, preferably by stitching 49. The center lines 51 of the longitudinal straps 33 are spaced apart at approximately equal intervals 53. The longitudinal straps 33, taken in the flat condition illustrated in FIG. 4, are long enough to extend somewhat beyond the rear edge of the rearmost lateral strap 31*a*. As shown, the rearmost lateral strap 31*a* has segments 55 of hook-and-loop material fastened to it, preferably by stitching, at intervals 57 which are preferably, but not necessarily, slightly greater than the intervals 51 at which the longitudinal straps 33 are fixed to the forwardmost lateral strap 31*i*. The unfixed ends of the longitudinal straps 33 are provided with mating segments 59 of hook-and-loop material extending from approximately the end of each strap 33 for a distance greater than the width of the rearmost lateral strap 31*a*. Thus, the length of the longitudinal straps 33 extending between the forwardmost and rearwardmost lateral straps 31*i* and 31*a* can be adjusted. This allows the lateral straps 31 freedom to be adjusted.

Figure 3:
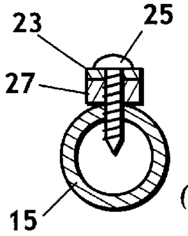
Fig. 3 (PRIOR ART)
FIG. 3 is a cross-sectional view taken along the line 3—3 of FIG. 2.
Figure 2:
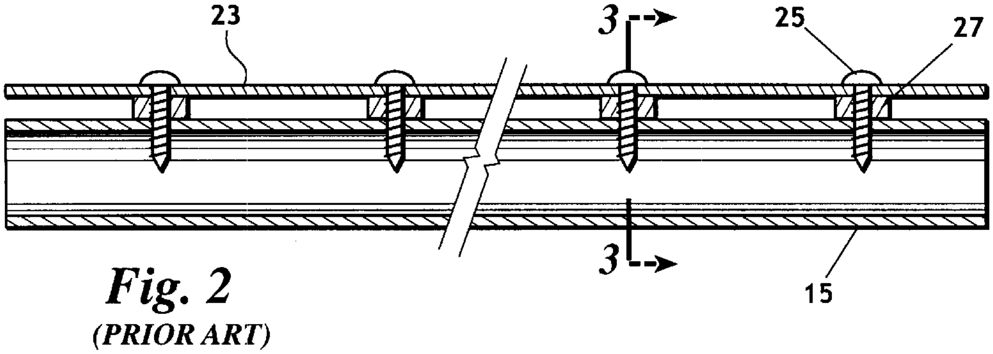
Fig. 2 (PRIOR ART)
FIG. 2 is a-vertical, longitudinal, diametric cross-sectional view of the seat rails of the wheelchair of FIG. 1.

Looking again at FIGS. 5 and 6, the mounting of the adjustable matrix wheelchair seat of FIG. 4 on the rails of FIGS. 2 and 3 is illustrated. The longitudinal straps 33 are, as shown in FIG. 4, permanently fixed to the forwardmost lateral strap 31*i* and attached by the mating hook-and-loop segments 55 and 59 to the rearmost lateral strap 31*a*. The tap screws 25 are removed to release the rods 23 from the rails 15. The buckles 41 are buckled on the straps 31 in a somewhat slack condition. The rods 23 are inserted into the buckled straps 31 in approximate alignment with the axes 37 and 39 as illustrated in relation to the matrix in FIG. 4. The rods 23 are then reattached to the rails 15 using the tap screws 25. The spacers 27 allow the straps 31 to slide between the rods 23 and their respective rails 15. As shown, the mating segments of hook-and-loop material 43 and 45 on the ends of the lateral straps 31 may be engaged to prevent the buckles 41 from inadvertently slipping on the straps 31. The screws 25 abutting the edges of the rearmost and forwardmost lateral straps 31*a* and 31*i* also serve as studs to check migration of these straps 31*a* and 31*i* along the rods 23.

Figure 7:
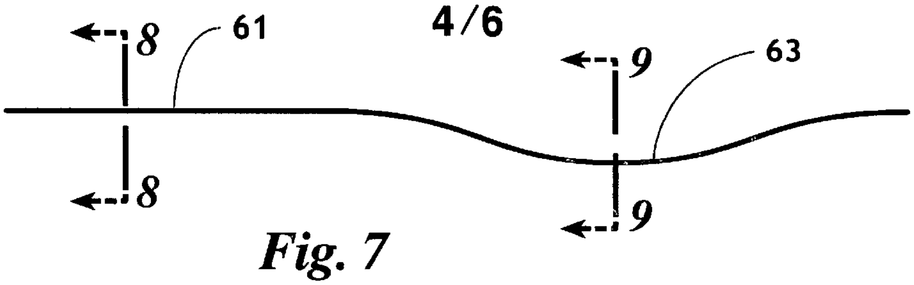
FIG. 7 is a one line representation of a typical initial longitudinal center line contour of the seat of FIG. 4.
Figure 8:
FIG. 8 is a one line representational cross-section of an initial contour of the seat of FIG. 4 taken along line 8—8 of FIG. 7.
Figure 9:
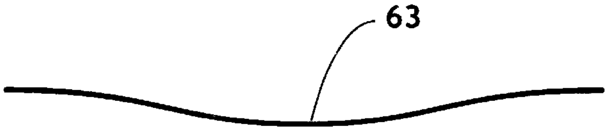
FIG. 9 is a one line representational cross-section of an initial contour of the seat of FIG. 4 taken along line 9—9 of FIG. 7.

Turning now to FIGS. 7 through 9, the preferred manner of finally adjusting the pressure pattern of the straps 31 and 33 is illustrated. FIG. 7 is a one-line illustration of a desired initial contour of the seat taken along a vertical plane longitudinally bisecting the seat between the rods 23. As shown, it is desired that, in the longitudinal direction, the forward part 61 of the seat be substantially flat and the rear part of the seat define a well or bucket 63. The flat part 61 of the seat, as illustrated in the one line representation of FIG. 8, should also be substantially flat from left to right. As shown in FIG. 9, the rear part 63 of the seat, looking at a vertical plane passing laterally through the lowest point of the bucket 63 as shown in FIG. 7, should also form a bucket from left to right. The exact final contour of the seat is dependent upon the contour and weight distribution of the intended occupant. The initial contour above described is achieved by adjusting the length of the lateral straps 31 by use of the buckles 41 and the length of the longitudinal straps 33 by repositioning the mating segments 55 and 59 connecting the rearmost lateral strap 31*a* to the rear portions of the longitudinal straps 33. This initial contour is based on visual assessment of the intended occupant.

In order to obtain maximum pressure distribution for the particular occupant of the seat, the intended occupant is then seated on the initial contour of the matrix. The points of greatest pressure can be identified by either use of the industry mapping system or by communication with the occupant as to the strap at which the pressure is greatest. The pressure pattern can then be altered by adjusting the tension in the lateral and longitudinal straps 31 and 33. This can be done by easing the tension in the straps at which greatest pressure is determined or by increasing tension in neighboring straps. Either way, the pressure will be distributed over a greater surface area of a greater number of straps. In a very few steps, optimal pressure distribution can be achieved. Length markings can be provided on each of the straps 31 and 33 so that, by recording the position of the markings, the intended occupant can always check the straps for conformance to the occupant's personal contour as an initial contour for the seat.

Figure 10:
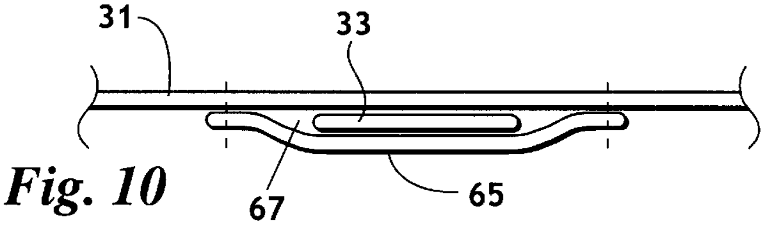
FIG. 10 is a cross-sectional view taken along line 10—10 of FIG. 4.

As shown in FIG. 4, the lateral and longitudinal straps 31 and 33 are alternatively interlaced in a one-to-one or single weft-warp weave. By interlacing the straps 31 and 33, their migration relative to each other is checked. This serves to maintain the matrix of interstices 35 to insure proper ventilation and also serves to insure maximum comfort of the seat. As is also shown in FIGS. 4 and 10, migration can also be checked by the use of bands 65 of material fastened at their ends to a longitudinal strap 33 to form a loop 67 to surround the lateral strap 31 and retain the lateral strap 31 against migration. In the preferred embodiment shown in FIG. 4, each of the lateral and longitudinal straps 31 and 33 are alternately interlaced so as to provide maximum resistance to migration. However, depending on the migratory characteristics of the straps 31 and 33, which will be a function of their width, thickness, stiffness and length, interlacing of all of the straps may not be necessary. Furthermore, if the retaining loop method of preventing or checking migration is used, not every intersection of lateral and longitudinal straps 31 and 33 necessarily requires a retaining loop 67. These migration checking methods can be used jointly or alternatively.

Figure 11:
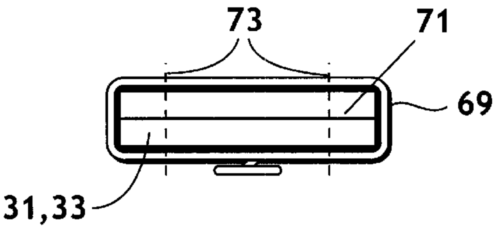
FIG. 11 is a cross-sectional view of a modified strap for use with the seat of FIG. 4.

Looking at FIG. 11, in the final prototype each of the straps 31 and 33 was encased in a contour fitted tube 69 of substantially inelastic material with a strip of foam 71 disposed between the top of the strap 31 or 33 and the tube 69. Preferably, the tube 69 and the foam strip 71 are permanently fixed to the strap 31 or 33 by stitching 73. In the final prototype, the entire length of each longitudinal strap 33 was covered in this manner and substantially all of the length of each lateral strap 31 extending between the upper surfaces of the rods 23 was covered in this manner. Alternatively, any or all of the straps 31, and 33 could remain uncovered, be covered by a tube or be covered by a tube with a foam strip inserted therebetween.

Figure 14:
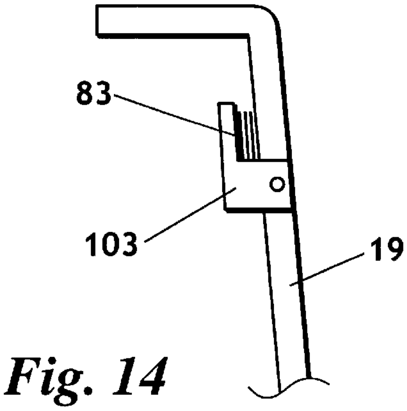
FIG. 14 is a side elevation view illustrating a bracket for supporting the back support of FIG. 12.
Figure 12:
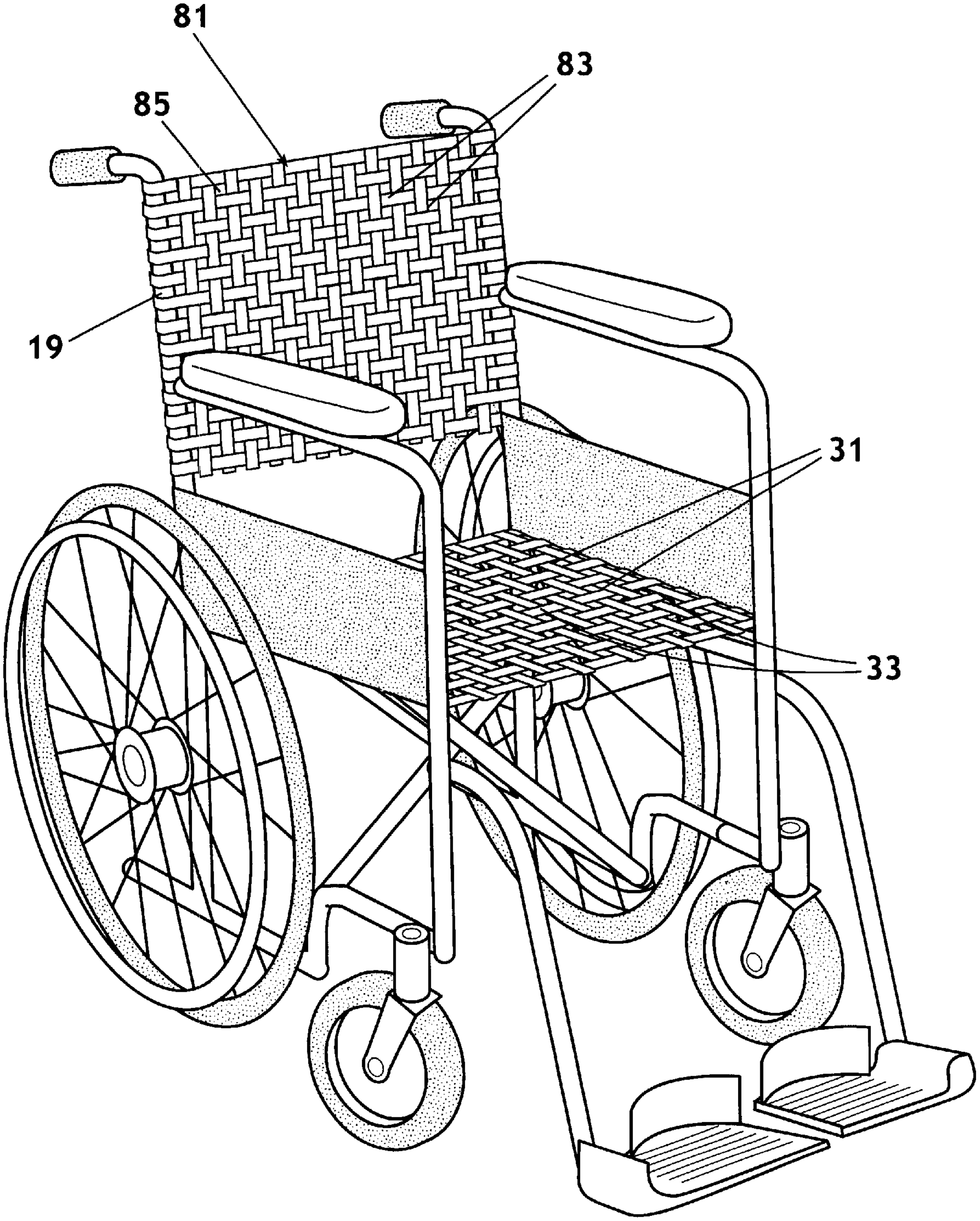
FIG. 12 is a perspective view of the wheelchair of FIG. 1 with a seat and a back support in accordance with the invention.
Figure 13:
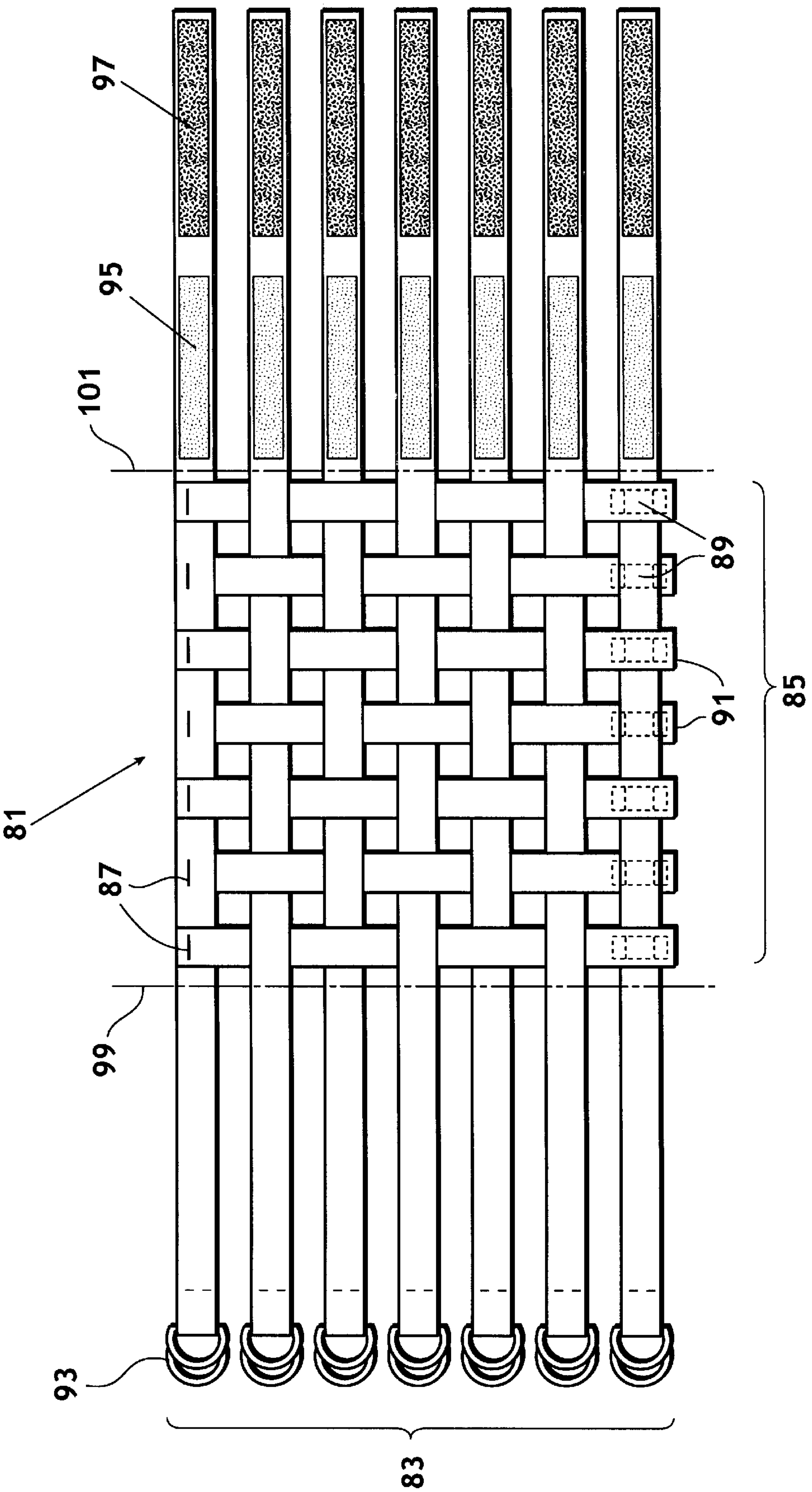
FIG. 13 is a top plan view of a preferred embodiment of an adjustable matrix wheelchair back rest in a laid-out condition.

Looking at FIG. 12, the wheelchair of FIG. 1 is illustrated with the adjustable matrix seat installed. In addition, an adjustable matrix back rest 81 is attached to the vertical posts 19. The back rest 81 is the same in all respects as the seat illustrated in FIG. 4 except that the lateral array of straps 83 is traversed by a vertical array of straps 85. As best seen in FIG. 13, the upper ends of the vertical straps 85 are fixed to the uppermost lateral strap 83, preferably by stitching 87. The lower ends of the vertical straps 85 are adjustably attached to the lowermost lateral strap 83, preferably by mating segments of hook-and-loop material 89 and 91. In the embodiment shown, buckles 93 such as D-rings are fixed to one end of the lateral straps 83 for connection to the other end of the lateral straps 83. Mating segments of hook-and-loop material 95 and 97 are used to prevent inadvertent slippage of the buckles 93. With the back rest 81 disposed against the front of the back posts 19 of the chair and with the axes 99 and 101 which extend just outside of the outermost vertical straps 85 aligned with the back posts 19, the lateral straps are wrapped around the back posts 19 and buckled behind them. Thus, for the back rest 81, the back posts 19 serve the same purpose as the rods 23 for the seat. Adjustment of the straps 83 and 85 is made in accordance with the pressure distribution pattern observed using the mapping system or in response to direction by the occupant. Adjustment of any or all of the lateral straps 83 and vertical straps 85 is similar to the adjustment of the lateral and longitudinal straps 31 and 33 of the seat, except that the initial contour of the back rest will not define a well 63 but will be more closely flat with a somewhat more supple or relaxed tension in the upper lateral straps 83. As shown in FIG. 14, brackets 103 can be fastened to the upper ends of the back support posts 19 to check possible migration of the back rest uppermost lateral strap 83 downwardly on the posts 19.

In the final prototype illustrated, nine lateral straps 31 of the matrix extend over and girt the metal rods 23, and buckle underneath the seating surface. Seven longitudinal straps 33 are preferably interlaced with the lateral straps 31 in an over-under configuration. In the case of the over-under weave, the longitudinal straps 33 are alternately attached to the upper and lower side of the rearwardmost lateral strap 31*a*. The hook-and-loop segments 55 and 59 are applied so the softer loop portion always faces upward and the hook portion faces downward, away from the seating surface. Thus, when the longitudinal straps 33 have been adjusted to increase the length of the seat and part of the hook-and-loop material is left exposed, only the softer loop portions will have potential for contact with the wheelchair occupant. As typified in FIG. 4, in one prototype, ½" by +e,fra 2+ee " bands 65 were sewn to the outermost longitudinal straps 33 on each side of the seat to define retaining loops through which the lateral straps 31 pass. This allows the lateral straps 31 to adjust independently and also aids in checking unwanted longitudinal migration along the rods 23.

In a most preferred embodiment, the straps 31 and 33 are made of one inch nylon webbing, chosen for strength and inelasticity. One half inch thick low density, open cell foam 71 is glued to the portion of the straps 31 and 33 forming the seating surface. This includes the entire length of the longitudinal straps 33 and the central portion of the lateral straps 31. The foam 71 and corresponding segments of straps 31 and 33 are covered with 500 denier nylon, a standard fabric used in wheelchair upholstery. For the prototype, the nylon was cut to 15" by 4" rectangles, sewn along one side to form tubes 69, turned, and slipped over the foam 71 and underlying straps 31 or 33. The covered strap sections were then sewn with two parallel rows of stitching 73 to compress the foam 71 for a flat, cushioned seating surface. The finished upholstered straps were one and one half inches wide.

When installed on the rods 23, the straps 31 and 33 were adjusted to create a flat, taut, pre-ischial shelf 61 in the forwardmost region of the seat, and a contoured ischial well 63 in the rearward portion of the seat. This ischial well 63 accommodated the region overlying and approximating the bony prominences known as the ischial tuberosities.

The pre-ischial shelf 61 of the seat underlies the posterior thighs of the wheelchair occupant. The pre-ischial shelf 61 offers firm support beneath the thighs, where flat bones such as femurs bear weight without acute pressure points and with reduced risk of pressure sores. This pre-ischial shelf 61 also discourages the wheelchair occupant from slipping forward in the wheelchair seat, as is common with wheelchair users.

The ischial well was adjusted to provide uniform support and achieve maximum distribution of pressure in the region surrounding the ischial tuberosities. Pressure distribution is improved because the straps 31 and 33 form a contoured shape and distribute pressure over a larger surface area which is the inverse shape of the ischial region.

Test subjects were seated in a standard sling wheelchair seat comprised of a taut expanse of nylon secured to the wheelchair frame by means of existing metal rods. Pressure was measured using the industry recognized mapping system. Test subjects were subsequently seated in the adjustable matrix wheelchair seat. Pressure was again mapped on the industry recognized mapping system. The straps 31 and 33 were adjusted to achieve optimum pressure distribution. While every test subject required individual adjustments to the straps defining the ischial well 63, pressure distribution was significantly better in the adjustable matrix seat even before adjustments were made. Test subjects were also able to identify which straps were bearing excessive pressure without seeing the test results, so subjective adjustments could be effectively made without use of the mapping system.

It is essential that the adjustable matrix wheelchair seat have one or more straps of adjustable length to permit alteration of the pressure pattern applied by the occupant and that the matrix of ventilating apertures be maintained, so that the seat can simultaneously provide relief for pressure and moisture related problems. The use of lateral straps 31 which girt the rods 23 and buckle to themselves is preferred because this embodiment affords maximum flexibility in positioning the straps 31 and 33. However, as long as the straps 31 and 33 can be adjusted so that balancing of pressure distribution can be achieved the straps 31 can be engaged in any way on the rods 23. For example, the straps 31 could be attached by screws or clamps to one rod 23 and adjustably connected to buckles attached to the other rod 23. Buckling could be accomplished by D-rings as shown or by cam lock, side release, rectangular loop or prong buckles, segments of hook-and-loop material, grommets, snaps or any known adjustable strap attachment device.

Also, while the prototype used 9 by 7 arrays of lateral and longitudinal straps 31 and 33, the number and/or width of the straps 31 and 33 could be varied depending, for example, on chair seat size and pressure and ventilation requirements. This is also true for the back rest 81. It is also conceivable that a layer of breathable, liquid impermeable fabrics such as Gore-Tex™ could be placed over the adjustable matrix so that incontinent persons could benefit from the pressure relief afforded by the adjustable matrix while maintaining some properties of ventilation.

Thus, it is apparent that there has been provided, in accordance with the invention, an adjustable matrix wheelchair seat which fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A wheelchair seat comprising a pair of rods adapted to be rigidly fixed to and aligned in a longitudinal direction relative to a frame of the wheelchair, a lateral array of spaced apart substantially inelastic straps extending between and engaged on said rods, a longitudinal array of spaced apart substantially inelastic straps engaged on a forwardmost and a rearwardmost of said straps of said lateral array and traversing said lateral array of spaced apart straps to define a matrix of ventilating interstices, means for independently adjusting a length of at least one of said straps of said lateral array to alter a pressure pattern imposed on said arrays by an occupant of the seat and at least one band fixed at ends thereof to one of said straps of said longitudinal array and cooperable therewith to define a retaining loop surrounding at least one of said straps of said lateral array.

2. A seat according to claim 1, said at least one band being fixed against a bottom surface of said one of said straps of said longitudinal array.

3. A wheelchair seat comprising a pair of rods adapted to be rigidly fixed to and aligned in a longitudinal direction relative to a frame of the wheelchair, a lateral array of spaced apart substantially inelastic straps extending between and engaged on said rods, a longitudinal array of spaced apart substantially inelastic straps engaged on a forwardmost and a rearwardmost of said straps of said lateral array and traversing said lateral array of spaced apart straps to define a matrix of ventilating interstices, means for independently adjusting a length of at least one of said straps of said lateral array to alter a pressure pattern imposed on said arrays by an occupant of the seat and mating segments of hook-and-loop material for independently adjusting a length of at least one of said straps of said longitudinal array, one said segment fixed to a rearward end of said at least one of said straps of said longitudinal array and another said segment fixed to said rearwardmost strap of said lateral array.

4. A wheelchair seat comprising a pair of rods adapted to be rigidly fixed to and aligned in a longitudinal direction relative to a frame of the wheelchair, a lateral array of spaced apart substantially inelastic straps extending between and engaged on said rods, a longitudinal array of spaced apart substantially inelastic straps engaged on a forwardmost and a rearwardmost of said straps of said lateral array and traversing said lateral array of spaced apart straps to define a matrix of ventilating interstices and means for independently adjusting a length of each of said straps of said lateral array to alter a pressure pattern imposed on said arrays by an occupant of the seat, each of said straps of said longitudinal array having a forward end thereof permanently fixed to said forwardmost strap of said lateral array and having a segment of hook-and-loop material fixed to a rearward end thereof and said rearwardmost strap of said lateral array having fixed thereto mating segments of hook-and-loop material corresponding to said segments on said straps of said longitudinal array for independently adjusting a length of each of said straps of said longitudinal array.

5. A seat according to claim 4, each of said straps of said longitudinal array being centered along said forwardmost strap of said lateral array at a first set of distance intervals and each of said mating segments of hook-and-loop material being centered along said rearwardmost strap of said lateral array at a second set of distance intervals greater than said first set.

6. A seat according to claim 4, said means for checking migration of said straps of said lateral array further comprising a plurality of bands, each band fixed at ends thereof to one of said straps of said longitudinal array and cooperable therewith to define a retaining loop surrounding one of said straps of said lateral array.

7. A seat according to claim 6, each said band being fixed against a bottom surface of its respective one of said straps of said longitudinal array.

8. A wheelchair seat comprising a pair of rods adapted to be rigidly fixed to and aligned in a longitudinal direction relative to a frame of the wheelchair, a lateral array of spaced apart substantially inelastic straps extending between and engaged on said rods, a longitudinal array of spaced apart substantially inelastic straps engaged on a forwardmost and a rearwardmost of said straps of said lateral array and traversing said lateral array of spaced apart straps to define a matrix of ventilating interstices, means for independently adjusting a length of each of said straps of said lateral array to alter a pressure pattern imposed on said arrays by an occupant of the seat and four studs, one fixed proximate each end of said rods and abutting an inside edge of said forwardmost and rearwardmost straps of said lateral array for checking migration of said forwardmost and rearwardmost straps of said lateral array in relation to said rods.

9. A wheelchair seat comprising a pair of rods adapted to be rigidly fixed to and aligned in a longitudinal direction relative to a frame of the wheelchair, a lateral array of spaced apart substantially inelastic straps extending between and engaged on said rods, a longitudinal array of spaced apart substantially inelastic straps engaged on a forwardmost and a rearwardmost of said straps of said lateral array and traversing said lateral array of spaced apart straps to define a matrix of ventilating interstices and means for independently adjusting a length of each of said straps of said lateral array to alter a pressure pattern imposed on said arrays by an occupant of the seat, each strap of said lateral and longitudinal arrays having their portions defining said matrix individually encased in contour fitted tubes of substantially inelastic washable material stitched thereto.

10. A seat according to claim 9, each strap of said lateral and longitudinal arrays having a strip of foam disposed between a top of said strap and its respective said contour fitted tube.

11. A wheelchair comprising a wheelchair frame, a carriage supporting said frame, a pair of rods extending from and aligned in a longitudinal direction relative to said frame, a lateral array of spaced apart substantially inelastic straps extending between and engaged on said rods, a longitudinal array of spaced apart substantially inelastic straps engaged on a forwardmost and a rearwardmost of said straps of said lateral array and traversing said lateral array of spaced apart straps to define a matrix of ventilating interstices, means for independently adjusting a length of at least one of said straps of said lateral array to alter a pressure pattern imposed on said arrays by an occupant seated on said arrays, a pair of rods extending from and aligned in an upright direction relative to said frame, a lateral array of spaced apart substantially inelastic straps extending between and engaged on said upright rods, a vertical array of spaced apart substantially inelastic straps engaged on an uppermost and a lowermost of said straps of said upright lateral array and traversing said upright lateral array of spaced apart straps to define a matrix of ventilating interstices and two brackets, one fixed proximate each upper end of said upright rods and supporting said uppermost strap for checking migration of said uppermost strap in relation to said uprights rods.

* * * * *